United States Patent
Brewington et al.

(10) Patent No.: US 6,684,743 B1
(45) Date of Patent: Feb. 3, 2004

(54) STAGGERED GEAR FOR BI-DIRECTIONAL OPERATION

(75) Inventors: James Gabriel Brewington, Raleigh, NC (US); Richard Hunter Harris, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/624,417

(22) Filed: Jul. 24, 2000

Related U.S. Application Data (62) Division of application No. 09/510,934, filed on Feb. 22, 2000, now Pat. No. 6,182,550, which is a division of application No. 09/243,590, filed on Feb. 3, 1999, now Pat. No. 6,095,007.

(51) Int. Cl.[7] .............................. B41J 11/70; B26D 5/20; F16H 29/12
(52) U.S. Cl. .............................. 83/13; 83/629; 83/603; 83/694; 83/202; 400/621; 74/437; 74/89.18; 74/98; 74/411; 192/48.92; 358/304; 100/288
(58) Field of Search ...................... 192/31, 44, 48.92; 74/437, 435; 400/621, 421; 83/13, 603, 601, 602, 604, 610, 611, 597, 698.11, 628, 629

(56) References Cited

U.S. PATENT DOCUMENTS

| | | | | | |
|---|---|---|---|---|---|
| 249,887 A | * | 11/1881 | Broadbooks | ............... | 83/629 X |
| 1,209,837 A | * | 12/1916 | Harris | ....................... | 74/437 X |
| 1,604,563 A | * | 10/1926 | Brown | ..................... | 74/437 X |
| 1,788,153 A | * | 1/1931 | Everett | ..................... | 83/628 X |
| 2,002,486 A | * | 5/1935 | Beford | ..................... | 83/628 X |
| 4,347,919 A | * | 9/1982 | Maeda | ..................... | 192/33 R |
| 4,810,110 A | * | 3/1989 | Myers | ......................... | 400/58 |
| 4,852,707 A | * | 8/1989 | Ito et al. | ....................... | 192/44 |
| 5,307,911 A | * | 5/1994 | Robinson | ..................... | 192/31 |
| 5,413,426 A | * | 5/1995 | Ijuin et al. | .................. | 400/621 |
| 5,482,389 A | * | 1/1996 | Bickoff et al. | ............. | 400/621 |
| 5,893,670 A | * | 4/1999 | Brewington et al. | ........ | 400/621 |
| 5,971,640 A | * | 10/1999 | Brewington et al. | ........ | 400/621 |
| 5,974,930 A | * | 11/1999 | Longrod | ..................... | 83/629 |
| 6,026,723 A | * | 2/2000 | Sakai | ......................... | 83/221 |
| 6,095,007 A | * | 8/2000 | Brewington et al. | .......... | 74/437 |
| 6,182,550 B1 | * | 2/2001 | Brewington et al. | ........ | 100/288 |

\* cited by examiner

*Primary Examiner*—Boyer D. Ashley
(74) *Attorney, Agent, or Firm*—J. Bruce Schelkopf (57) ABSTRACT

A gear drive system for a printer designed to print upon a continuous roll of paper and having a blade used to cut off printed portions of paper from the paper roll is implemented. The gear drive system consists of a drive shaft 330, a slip clutch 401, a clutch gear 116, a drive gear 110, and a staggered gear 112 which controls the paper cutter blade 106. During printing, clutch 401 allows the drive shaft 330 shaft to slip relative to the clutch gear 116. When printing stops, clutch 401 locks clutch gear 116 which is engaged with the first portion of staggered gear 112 and causes staggered gear 112 to rotate until the second portion of staggered gear 112 engages the drive gear 110. Staggered gear 112 is then driven by the drive gear 110. A cutter blade is controlled by staggered gear 112, with the blade cutting off the paper as the drive gear 110 is in reverse rotation. After the paper is cut, drive gear 110 resumes its forward rotation, rotating staggered gear 112 and consequently, rotating cutter blade 106 away from the paper. After the blade has been rotated, staggered gear 110 continues to turn, until the drive gear disengages with the second portion of the staggered gear. Full torque is applied to both cutting and opening rotations of the cutter blade.

6 Claims, 6 Drawing Sheets

Front View

FIG. 3B

Back View

FIG. 4

FIG. 5

STAGGERED GEAR FOR BI-DIRECTIONAL OPERATION

CROSS REFERENCE TO RELATED APPLICATION

This application is a divisional of U.S. application Ser. No. 09/510,934 filed on Feb. 22, 2000, U.S. Pat. No. 6,182,550, which was a divisional of U.S. application Ser. No. 09/243,590, filed Feb. 03, 1999 issued as U.S. Pat. No. 6,095,007.

TECHNICAL FIELD

The invention relates in general to printers having geared drive systems, and in particular to geared drive systems for printers that operate a cutter blade.

BACKGROUND INFORMATION

Printers may be classified as single-sheet printers or continuous-roll printers. Single sheet printers include drive and handling means to advance one sheet of paper at a time past a print head so that characters may be printed thereon. As each sheet is printed, it is ejected to be received by the user. Continuous-roll printers include a roll of paper instead of a supply of single sheets of paper. As the roll of paper is unrolled, the end of the paper is advanced past the print head by feed rollers or other drive mechanism for printing. After a printing job is completed, a blade or knife cuts the printed paper or the paper is detached manually using a tear bar. Common continuous-roll printers include thermal paper fax machines and retail checkout registers.

It is common to use a geared drive system in a continuous-roll printer with a stepper motor as a power source. Typically, a stepper motor will turn a fixed number of degrees in response to a pulse of electricity or a command from a controller. Gears are used to connect the stepper motor to the drive mechanism to ensure that a fixed rotation translates to a fixed advancement of the paper from the paper roll. It should be noted that the use of a stepper motor is not required, as other power sources may be used to control the rotation of the drive source and the feed rollers to accurately position the paper in relation to the print head for precise printing.

When the stepper motor turns in the forward direction in a continuous-roll printer, the paper is unwound from the paper roll and advanced past the print head. Turning the stepper motor in the reverse direction engages the knife or cutter blade to cut the printed paper from the roll. Using the same motor for feeding paper through the printer and cutting the printed paper is economical.

Continuous-roll printers are generally designed to only print in the forward direction. The paper is not retracted or wound back onto the paper roll during or after printing. With a direct gear system, reversing the stepper motor results in reverse feeding of the paper. Therefore the stepper motor, when turning in reverse, decouples from the paper drive system as it engages the cutter mechanism.

A wrap spring slip clutch, hereinafter referred to as a slip clutch, with an overrunning torque connects the gear drive system and the cutter blade. Slip clutches are used to transmit power in one direction of rotation only (called the "locking rotation") and include teeth, ratchet or spring mechanisms that lock a driven part to a driving part when the driven part is turned in the locking direction. When the rotation of the driving part is reversed (called the "overrunning direction"), the mechanism releases, causing the driven part to stop turning while the driving part continues to turn, or "overrun" the driven part.

Some slip clutches are designed with an "overrunning torque" or a mechanism that will not automatically release during reverse rotation. A slip clutch with an overrunning torque will transmit torque from the driven part to the driving part even in the reverse direction, but will slip if the torque required to drive the driven part exceeds the overrunning torque.

As an example, consider a slip clutch with an overrunning torque of 1 inch-ounce. This slip clutch will lock if driven in is locking rotation, transmitting rotation of the driving part to the driven part without slippage. In the reverse rotation, the clutch will slip if the load on the driven part exceeds 1 inch-ounce. Causing the clutch to slip, however, requires an amount of torque equal to the overrunning torque as a friction loss. In other words, a drive motor generating 10 inch-ounces of torque in the reverse direction through a clutch that is slipping wastes 1 inch-ounce of torque that are required to cause the clutch to slip. The effective torque of the motor is thereby reduced to 9 inch-ounces.

The slip clutch is configured so that a reverse rotation of the stepper motor causes a locking, or forward rotation of the slip clutch. When the stepper motor and gear drive are driven in reverse, the slip clutch locks, engaging the cutter blade to slice off a piece of paper. Afterwards, the stepper motor resumes its forward rotation, causing the slip clutch to turn in reverse. The clutch, however, will not release until the torque required to continue turning the driven part exceeds the overrunning torque. Therefore, the cutter blade will be lifted, as slip clutches can be designed to have an overrunning torque greater than the torque required to lift the cutting blade out of the paper path. The cutter blade continues to lift until it reaches a stop or limit mechanism, preventing further rotation, greatly increasing the torque required to lift the blade, and causing the slip clutch to release.

Even after the blade is lifted and the clutch released the stepper motor must continue to expend energy overcoming the overrunning torque so the blade will not fall back into the paper path. The overrunning torque of the slip clutch is high compared to normal wrap spring clutches because the overrunning torque must be high enough to reliably open the cutter blades. Furthermore, the torque to open the cutter blade is limited to the overrunning torque. This results in friction loss, is a waste of energy, and increases the cost of the printer because a larger stepper motor must be specified than is required to drive paper through the paper path for printing. Additionally, it is rare that a slip clutch has a constant overrunning torque during its lifetime because environmental conditions, wear, and age modify the behavior of the clutch over time. If the overrunning torque becomes too high, paper will not feed properly because too much of the stepper motor's torque is wasted overcoming the friction generated by the overrunning torque. If the overrunning torque becomes too low, the cutter blade will not open or may slip back down into the paper path during printing.

What is needed, therefore, is a device to allow a cutter blade to engage upon reverse rotation of the stepper motor, to disengage upon the consequent forward rotation of the stepper motor in such a manner that full torque can be applied to both open and close the cutter blades, and to maintain its position out of the paper path during printing without adding the friction associated with an overrunning-style slip clutch to the system.

One solution was disclosed in previously filed U.S. patent application Ser. No. 08/919,749 for a clutchless drive system. However, the clutchless drive system depends on frictional forces to create the torque required for engagement of the cutter blade upon reverse rotation of the cutter motor. Over time, these frictional forces might cause wearing and maintenance problems. What is needed is a device that ensures that a positive engagement of the drive is engaged during the entire cycle, thereby eliminating the dependence on frictional forces.

SUMMARY OF THE INVENTION

The previously mentioned needs are fulfilled with the present invention. Accordingly, there is provided, in a first form, a staggered gear divided into two semi-circular portion which are staggered along the staggered gear's rotational axis such that a first portion can be driven by one gear during one part of a revolution and a second portion can be driven by another gear at during another part of the revolution. The staggered gear is a member of a drive system for a printer including a drive gear connected to a drive shaft and includes a slip clutch capable of transmitting power through a clutch gear in one rotational direction only wherein the drive shaft connects the slip clutch, clutch gear and drive gear such that the clutch gear and the drive gear are adjacent to each other, and the staggered gear is positioned so that it can be driven by either the clutch gear or the drive gear. The staggered gear controls the printer cutter blade. Each portion of the staggered gear has a section of starter teeth supported by a cantilevered section for easing the transition between the clutch and drive gears.

The staggering of the two portions of the same gear allows the staggered gear to be fully disengaged from the drive gear in one direction, and allows the staggered gear to be fully disengaged from the clutch in the other direction. Thus, full torque can be applied to the staggered gear in both directions to both close and open the cutter blades. The application of full torque to the staggered gear results in the use of a smaller and more efficient motor saving power and cost. Additionally, the low overrunning torque increases the torque available to feed paper.

These and other features, and advantages, will be more clearly understood from the following detailed description taken in conjunction with the accompanying drawings. It is important to note the drawings are not intended to represent the only form of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The principles of the present invention and their advantages are best understood by referring to the illustrated embodiment depicted in FIGS. 1 and 3–5 of the drawings, in which like numbers designate like parts. In the following description, well-known elements are presented without detailed description in order not to obscure the present invention in unnecessary detail. For the most part, details unnecessary to obtain a complete understanding of the present invention have been omitted in as much as such details are within the skills of persons of ordinary skill in the relevant art. Details regarding control circuitry or mechanisms used to control the rotation of the various elements described herein are omitted, as such control circuits are within the skills of persons of ordinary skill in the relevant art.

Figure 2A:
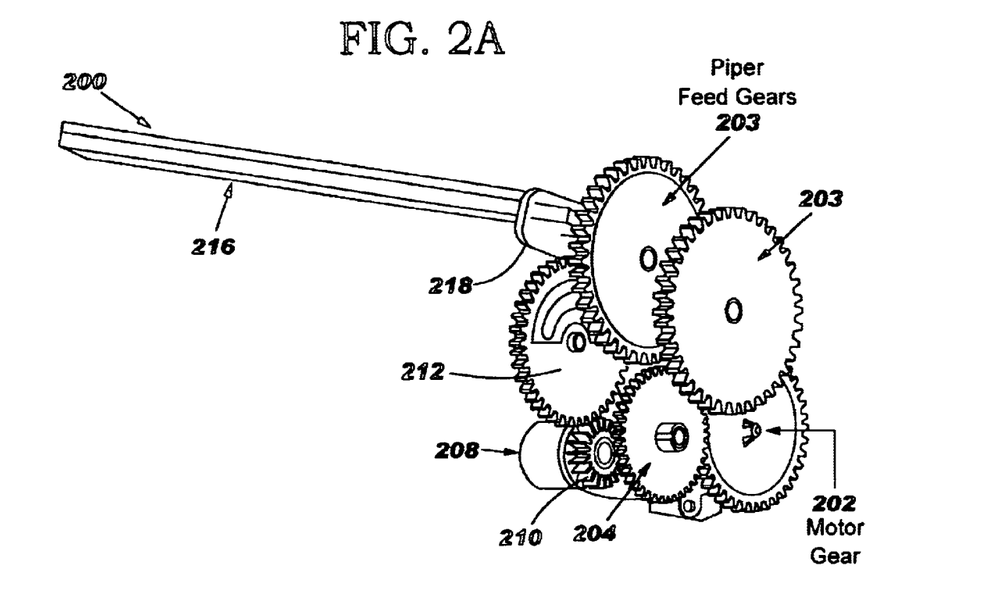
FIG. 2A is a rear view of a related art gear drive mechanism typically found in printers.
Figure 2B:
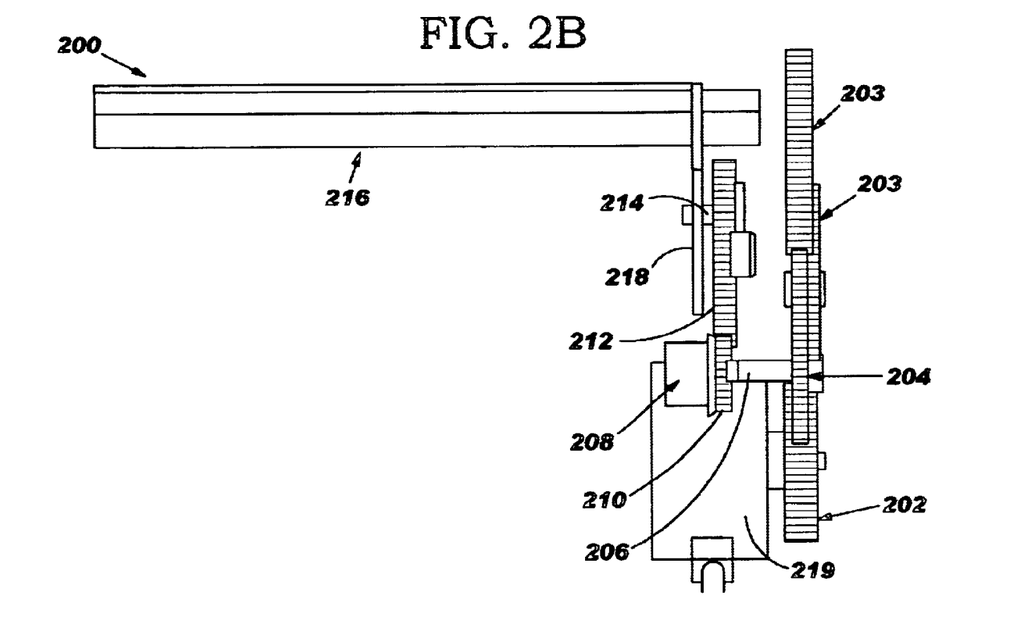
FIG. 2B is a perspective view of a gear drive mechanism in accordance with the mechanism disclosed in FIG. 2A.

FIGS. 2A and 2B are a rear view and a perspective view of gear drive system 200 of related art typically used in printing devices. Motor gear 202 is driven by a stepper motor 219 or other power source. Motor gear 202 meshes with paper feed gears 203. Paper feed gears 203 drive feed rollers or another mechanism (not illustrated) to feed paper from a roll of paper through a paper path and past a print head for printing. To prevent paper from being feed backwards during the cut cycle, paper feed gears 203 are decoupled from the paper feed rollers by either a one way clutch or similar device. Clutch gear 204 is also driven by motor gear 202. Clutch gear 204 transmits power through shaft 206 to slip clutch 208. The output, or drive portion, of slip clutch 208 is attached to slip clutch gear 210. Slip clutch gear 210 drives cutter blade gear 212. Carried by cutter blade gear 212 is pin 214 which extends from cutter blade gear 212 at a point near cutter blade gear 212's perimeter.

Also illustrated in FIGS. 2A and 2B are cutter blade 216 and cutter blade bracket 218. Cutter blade bracket 218 is attached to one end of cutter blade 216. Cutter blade bracket 218 has a slot (not illustrated) into which pin 214 extends. As cutter blade gear 212 rotates, pin 214 causes cutter blade bracket 218 to rotate and cutter blade 216 to move across the paper in a cutting motion.

Slip clutch 208 is configured so that its locking rotation is counterclockwise when viewed in FIG. 2B. When motor gear 202 is driven clockwise, clutch gear 204 and shaft 206 turn in a counterclockwise direction. This locks slip clutch 208, causing slip clutch gear 210 to turn counterclockwise. The counterclockwise motion of slip clutch gear 210 causes a clockwise rotation of cutter blade gear 212. As cutter blade gear 212 rotates clockwise, pin 214 follows, driving blade bracket 208 which rotates cutter blade 216 clockwise into the paper path to cut the paper.

After the paper is cut, the stepper motor 219 or other drive source reverses rotation, which in turn reverses clutch gear 204 and shaft 206 to a clockwise direction. Slip clutch 208 is configured with an overrunning torque higher than the torque required to "unwind" cutter blade gear 212 and rotate cutter blade 216 counterclockwise out of the paper path. Cutter blade 216's counter-clockwise rotation is limited, however, by a stop or other limit device (not illustrated). Once cutter blade 216 reaches its limit of rotation, further rotation of cutter blade gear 212 and slip clutch gear 210 is impeded, however clutch gear 204 and shaft 206 continue to rotate, causing slip clutch 208 to unlock.

The disadvantages presented by this arrangement are many. First, slip clutch 208 must be designed with an amount of overrunning torque so cutter blade 216 will open in response to the "backwards" (counterclockwise) rotation of cutter blade gear 212. Additionally, slip clutch 208 must be designed with overrunning torque so cutter blade 216 will not fall back into the paper path during printing or paper feeding. This overrunning torque acts as a drag on the motor or power source. The energy of the motor is ideally used to feed paper through the printer, and increasing the size of the motor to overcome the overrunning torque of slip clutch 208 results in a waste of energy and increases motor costs. Second, as the slip clutch wears, the overrunning torque may decrease, which lessens the load on the motor, but tends to allow cutter blade 216 to fall to open. Finally, the overrunning torque may increase over time, which will increase the load on the motor, decreasing the motor's ability to feed paper through the printer.

Figure 1:
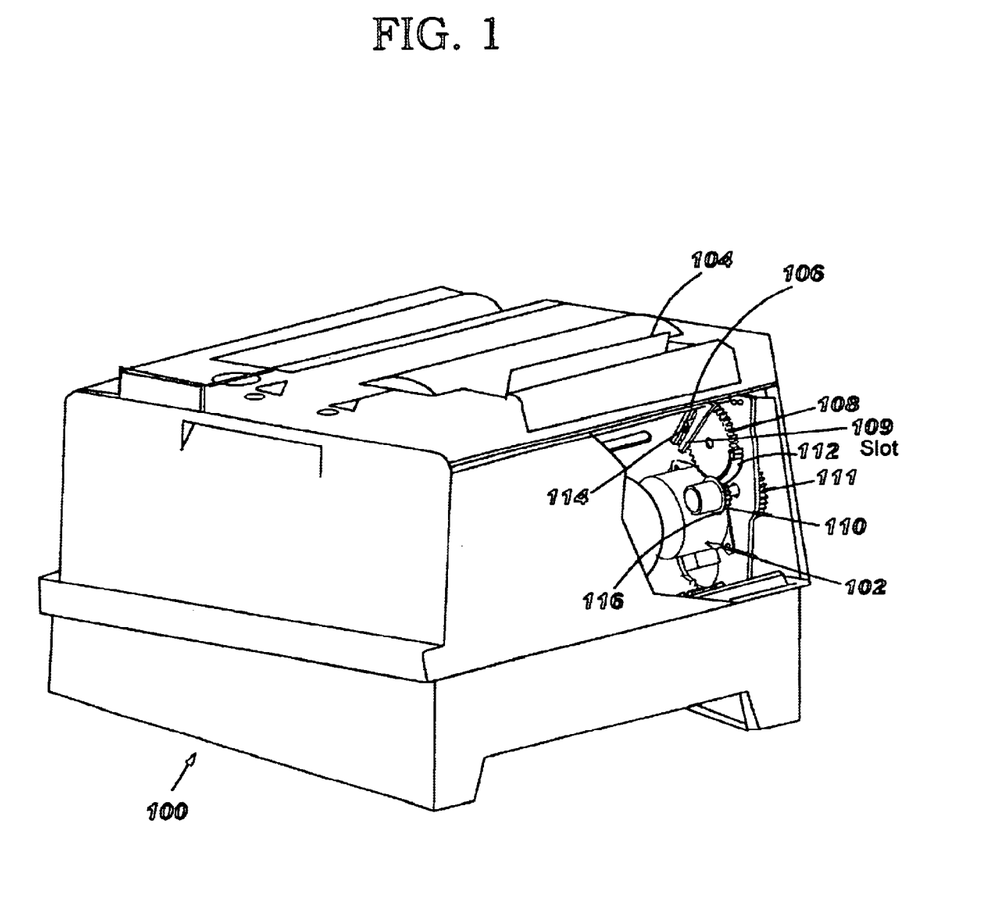
FIG. 1 is a perspective view of a printer incorporating one embodiment of the present invention.

Turning now to FIG. 1, a printer 100 is illustrated incorporating one embodiment of the present invention. A portion of the wall of printer 100 has been removed to illustrate interior detail and a portion of the elements of the present invention. Printer 100 comprises drive motor 102 which is used to feed paper 104 from a paper roll (not illustrated) along a paper path (not illustrated) for printing by a print head (not illustrated). The paper roll is stored inside printer 100. The portion of paper visible in FIG. 1 has been printed and is in a position to be cut off by cutter blade 106. Cutter blade 106 is attached to cutter blade bracket 108. Cutter blade bracket 108 comprises a slot 109. Rotation and torque from motor 102 is transmitted by gearing 111 (only a portion of gearing 111 is visible) to fixed gear 110. When printing is complete and the paper is to be cut, motor 102 reverses engaging clutch gear 116 which causes dual plane clutch gear 112 to rotate until fixed gear 110 can engage dual plane clutch gear 112. Pin 114 is then carried by dual plane clutch gear 112. Pin 114 extends from dual plane clutch gear 112 at a point near dual plane clutch gear 112's perimeter. Pin 114 engages slot 109, so that rotation of dual plane clutch gear 112 causes pin 114 to rotate cutter blade bracket 108, such that cutter blade 106 rotates a cut edge (not illustrated) across the paper path in a cutting motion.

Drive motor 102 is preferably a stepper motor, although any power source that provides a controlled rotation may be used.

Printer 100 in FIG. 1 is only one embodiment of the present invention. Other embodiments may include fax machines using thermal paper, a printer that uses a knife or cutter blade to cut a printed portion of paper away from a roll of paper, and the like.

Turning now to FIGS. 3A, 3B, 4, and 5, a front view, a back view, a side view, and an isometric view of one embodiment of the present invention are illustrated. The apparatus illustrated in FIGS. 3A, 3B, 4, and 5 is intended to replace slip clutch 208 and cutter blade gear 212 of FIGS. 2A and 2B to overcome their inherent disadvantages. The apparatus in FIGS. 3A, 3B, 4 and is also illustrated in FIG. 1 as installed in printer 100.

Figure 3A:
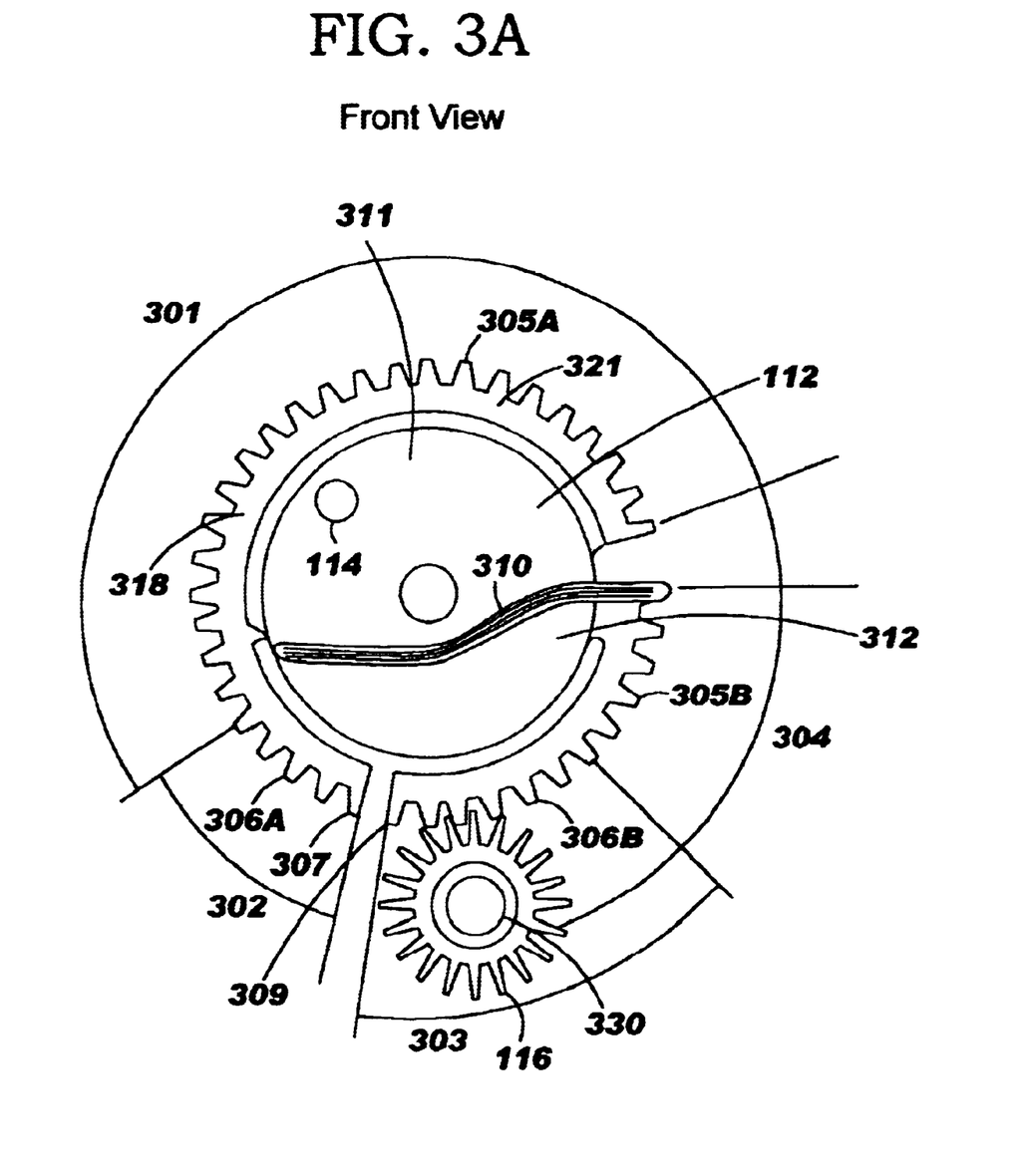
FIG. 3A is a front view of the dual plane clutch gear feature of one embodiment of the present invention.

FIG. 3A is a front view of dual plane or staggered gear 112. Staggered gear 112 is divided into a first portion which is staggered with respect to a second portion along the rotational axis of the staggered gear 112. A perimeter of the first portion is divided into sections 303 and 304. A perimeter of the second portion is divided into sections 301 and 302. First section 301 is comprised of gear teeth 305A, which are nonelastic and sized and spaced to mesh with the teeth of fixed gear 110. For the purpose of this description and the following claims, the word "nonelastic" means stiff or not easily yielding under pressure or forces. Fixed gear 110 is obscured from this view by clutch gear 116 because clutch gear 116 has substantially the same gear teeth height, pitch and spacing as fixed gear 110. Fixed gear 110 and clutch gear 116 are coaxial. The teeth of slip clutch gear 116 and fixed gear 110 are also nonelastic.

Second section 302 has starter teeth 306A. Starter teeth 306A are nonelastic and have the same spacing, or pitch, as gear teeth 305A but are shorter in height than gear teeth 305A to facilitate meshing between fixed gear 110 (not shown) and staggered gear 112. All of starter teeth 306A are shorter in height than gear teeth 305A, however first starter tooth 307 is the shortest, with each successively clockwise starter tooth 306A taller than a preceding starter tooth 306A. Starter teeth 306A are supported on a cantilever section attached to staggered gear 112 near the transition between sections 301 and 302.

Third section 303 has starter teeth 306B which, as shown in FIG. 3A, mirror starter teeth 306A, but are in a different plane than starter teeth 306A. For the purpose of this description and the following claims, the word "plane" means the volume between two substantially flat and parallel imaginary surfaces. Starter teeth 306B are nonelastic and have the same spacing, or pitch, as gear teeth 305 and 306A but are shorter in height than gear teeth 305A to facilitate meshing between clutch gear 116 and staggered gear 112. All of starter teeth 306B are shorter in height than gear teeth 305, however first starter tooth 309 is the shortest, with each successively counterclockwise starter tooth 306B taller than a preceding starter tooth 306B. Starter teeth 306B are supported on a cantilever section attached to staggered gear 112 near the transition between sections 303 and 304.

Fourth section 304 is comprised of gear teeth 305B, which are nonelastic and substantially identical to gear teeth 305A, and sized and spaced to mesh with the teeth of spring clutch gear 116.

Three flat gear surfaces are shown in FIG. 3A because sections 301 and 302 are staggered along staggered gear 112's rotational axis with respect to sections 303 and 304. Gear surface 312 is closer to the viewer, gear surface 318 is the farther from the viewer, and gear surface 311 lies between gear surface 312 and gear surface 318. Curved surface 310 is a transition surface between the gear surface 312 and the gear surface 311. Curved surface 310 is positioned such that it does not interfere with the movement of pin 114 and the rotation of cutter blade bracket 108 (not shown), and there is enough material to structurally support the cantilevered supports for sections 303 and 304. Transition gear surface 321 is shown as a semi-circular line because it is perpendicular to gear face 311 and gear face 318.

Sections 303 and 304 are in the first portion of staggered gear 112. Sections 303 and 304 lie in substantially the same plane and are positioned to engage clutch gear 116. Sections 301 and 302 are in the second portion of staggered gear 112. Sections 302 and 301 lie in a plane farther from the viewer than sections 303 and 304. Sections 303 and 304 are positioned such that gear teeth 305B and 306B mesh with the teeth of clutch gear 116.

Figure 3B:
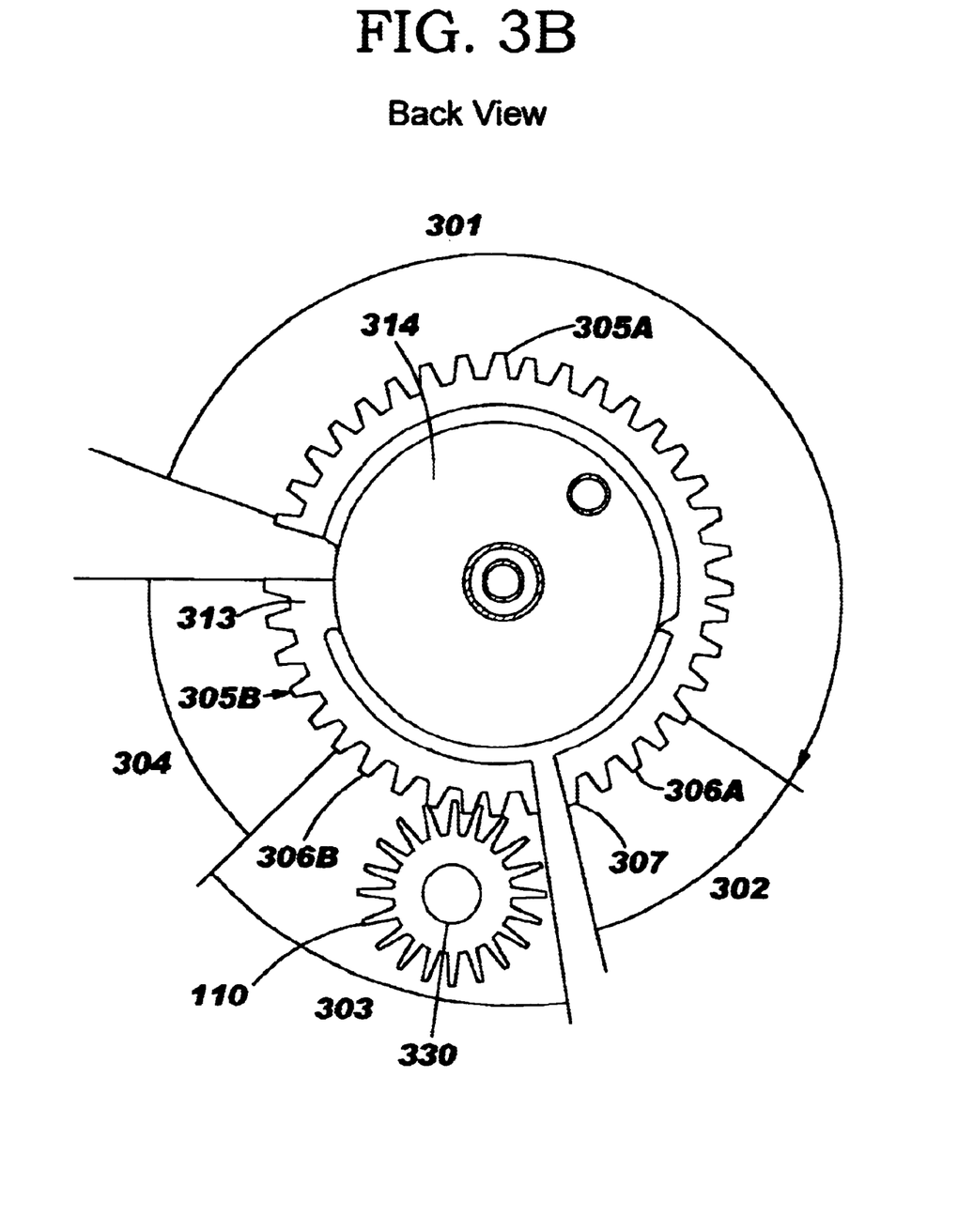
FIG. 3B is a back view of the dual plane clutch gear disclosed in FIG. 3A.

FIG. 3B is a back view of staggered gear 112 showing sections, 301, 302, 303 and 304. In this view, sections 303 and 304 are in a plane farther from the viewer relative to sections 301 and 302. Two gear surfaces are shown in FIG. 3B. Transition gear surface 315 is shown as a semi-circular line because it is perpendicular to gear face 313 and gear face 314. Gear surface 314 is closer to the viewer than gear surface 313.

First section 301 is comprised of gear teeth 305A. Second section 302 has starter teeth 306A. Third section 303 has starter teeth 306B. The fourth section 304 is comprised of gear teeth 305B. Because clutch gear 116 is in a plane behind fixed gear 110, it is obscured from this view by fixed gear 110. Thus, fixed gear 110 appears to be engaged with staggered gear 112. Actually, fixed gear 110 is in a plane closer to the viewer than section 303 of staggered gear 112 and is not engaged with staggered gear 112. Only clutch gear 116 is engaged with staggered gear 112. Fixed gear 110 has substantially the same gear teeth height, pitch and spacing as clutch gear 116.

Figure 4:
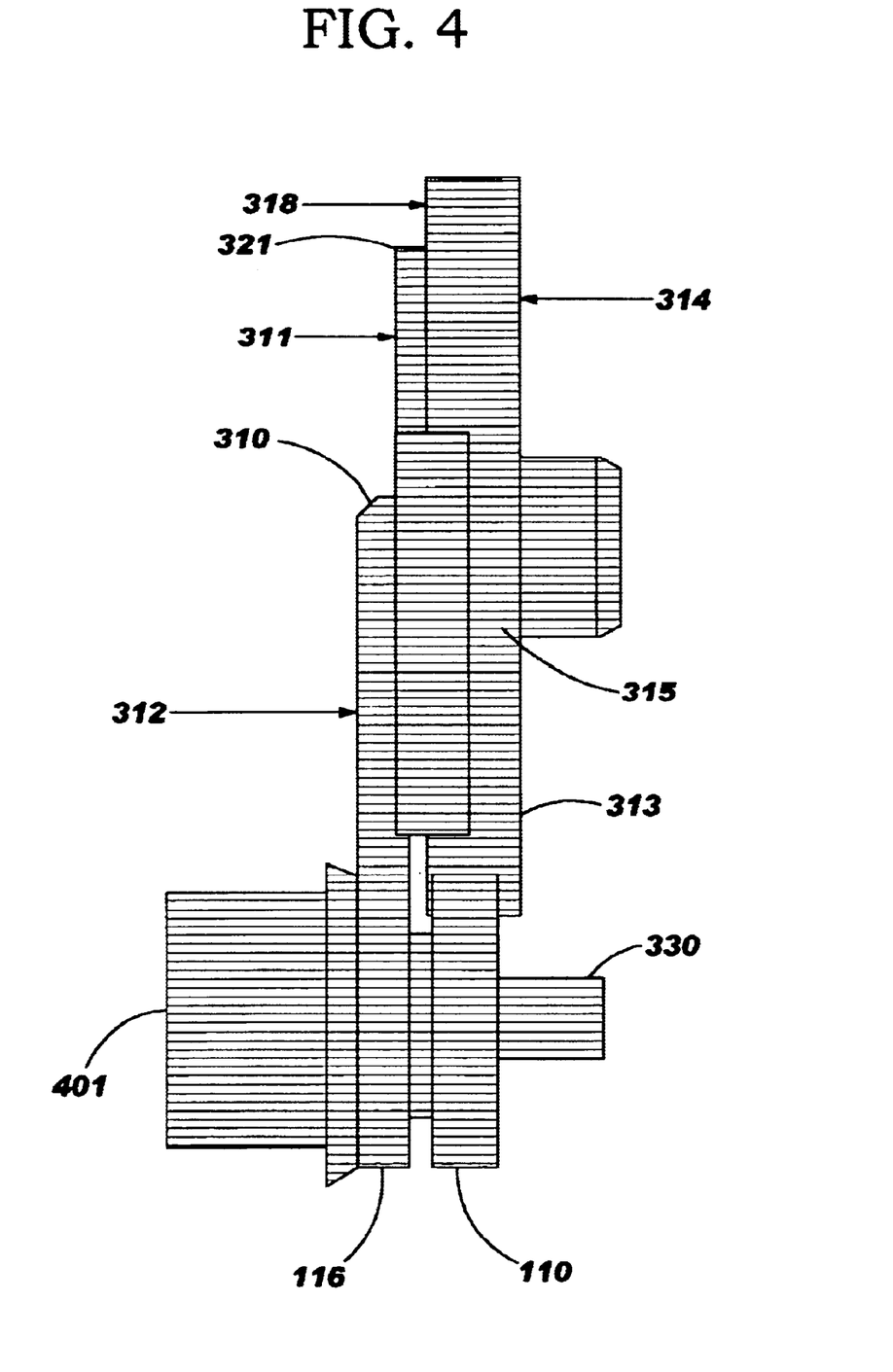
FIG. 4 is a side view of the dual plane clutch gear mechanism disclosed in FIGS. 3A and 3B.

FIG. 4 is a side view of the staggered gear shown in FIGS. 3A and 3B. Gear surfaces 311, 312, 318, and 314 are perpendicular to the viewer and are seen as straight lines. The surfaces that are parallel to and can be seen from FIG. 3A are gear surface 312, gear surface 311, and gear surface 318. Curved surface 310 and transition surface 321 are also shown. The surfaces that are parallel to and can be seen from FIG. 3B are gear surface 314 and gear surface 313. Transition surface 315 is also shown.

FIG. 4 also shows gear teeth 306B engaged in the teeth of a spring clutch gear 116 which is mounted on shaft 330. For clarity, only part of shaft 330 is shown in this view. Along the rotational axis, a first plane or the first portion of staggered gear 112 can be defined as that portion of the gear that lies between surface 312 and 311 and corresponds to section 303 and 304 of FIGS. 3A and 3B. A second plane or the section portion of staggered gear 112 can be defined as that portion of the gear that lies between surface 318 and 314 which corresponds to sections 301 and 302 of FIGS. 3A and 3B. Fixed gear 110 is shown such that it engages the second portion of staggered gear 112. Clutch gear 116 is shown on shaft 330 such that it engages the first portion of staggered gear 112. Coupled with clutch gear 116 is a wrap spring clutch 401. Slip clutches are used to transmit power in one direction of rotation only (called the "locking rotation") and include teeth, ratchet or spring mechanisms that lock a driven part to a driving part when the driven part is turned in the locking direction. When the rotation of the driving part is reversed (called the "overrunning rotation"), the mechanism releases, causing the driven part to stop turning while the driving part continues to turn, or "overrun" the driven part. Spring clutch 401 is readily available in the marketplace and well known to those who practice the art of designing gear systems for paper printers.

Figure 5:
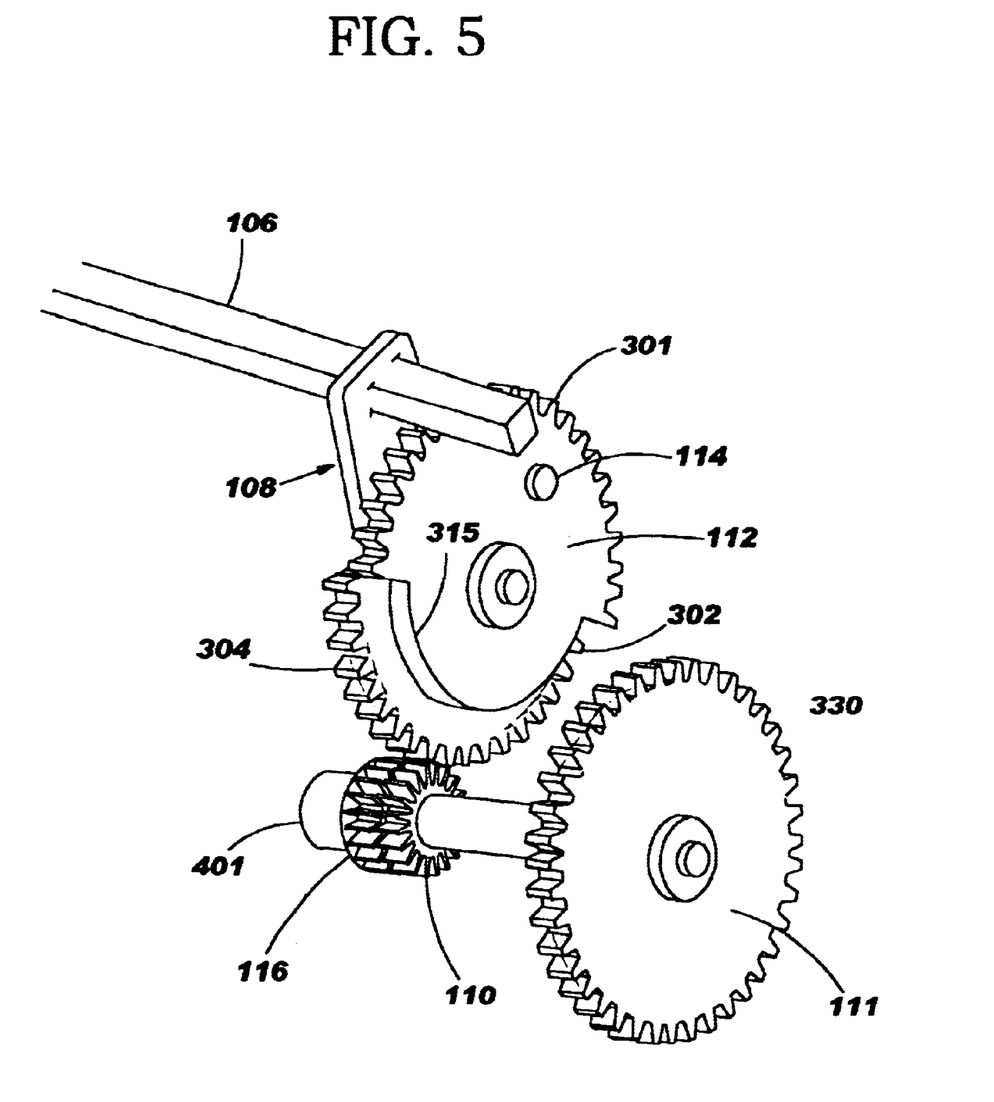
FIG. 5 is a perspective view of the dual plane clutch gear mechanism of one embodiment of the present invention.

FIG. 5 is an isometric drawing showing a partial view of cutter blade 106 attached to cutter blade bracket 108. Cutter blade bracket 108 is partially shown because it is obscured by staggered gear 112. Pin 114 extends through a circular opening in staggered gear 112 to a slot (not shown) in cutter blade bracket 108. The gear teeth 306B of staggered gear 112 are engaged in the teeth of a spring clutch gear 116. Also connected to shaft 330 is spring clutch 401 and fixed gear 110. Shaft 330 is driven by gearing 111 (partially shown) which is driven by motor 102 (not shown).

OPERATION

The manner of using staggered gear 112 can be illustrated by showing it as a member of a gear assembly illustrated in FIGS. 5 and 3B.

In FIG. 3B, clockwise rotation of shaft 330 and drive gear 110 corresponds to normal printing and paper feeding of printer 100. Spring clutch 401 is configured so that its overrunning rotation is clockwise when viewed in FIG. 3B. When the printer is feeding paper, spring clutch gear 116 mesh with gear teeth 305B or 306B. A stop (not shown) limits the rotation of staggered gear 112 such that spring clutch shaft 330 spins freely relative to clutch gear 116 because spring clutch is being driven in the overrunning direction. Fixed gear 110 turns clockwise but does not engage staggered gear 112 because it is staggered and in another plane relative to section 303 and 304. When printing is completed and the paper is to be cut by cutter blade 106, drive motor 102 (FIG. 1) reverses, causing gearing 111 to turn shaft 330 counterclockwise which causes clutch 401 to lock with clutch gear 116 turning clutch gear 116 counterclockwise. Because clutch gear 116 is no longer turning in the overrunning direction, clutch gear 116 causes a clockwise rotation in staggered gear 112. In the beginning of the cut cycle, the load on clutch gear 116 and staggered gear 112 is minimal. As the cutter starts to close, there is still minimal loads on staggered gear 112. At this point in the cycle, a transition occurs where the last teeth of 306B are starting to disengage with the spring clutch gear 116 in one plane and the teeth of fixed gear 110 engaged starter teeth 306A in another plane. Because starter teeth 306A are shorter than gear teeth 305A, the gears tend to mesh easily without binding or locking. Bending or locking is also eliminated because any mismatch between starter teeth 306A and gear teeth 305A will flex the cantilever support to allow the teeth to mesh. Once staggered gear 112 has rotated to so that gear teeth 305A of section 301 are fully engaged with the fixed gear teeth, staggered gear 112 is no longer engaged with the teeth of spring clutch gear 116. At this point in the cycle, full available torque can be transmitted from fixed gear 110 to staggered gear 112 in both directions. No power is lost overcoming an overrunning torque of a clutch because the clutch is no longer engaged with staggered gear 112. Another mechanism (not shown) such as spring clutch or similar device decouples the paper feed drive so that the paper is not fed backwards during the cut cycle. Such a device is common in the marketplace and well known to those skilled in the art of designing printers.

After the paper has been cut, normal printing and paper feeding is continued. As such drive gear 111 returns to a clockwise rotation, causing staggered gear 112 to follow along in a counterclockwise rotation, opening cutter blade 106 out of the paper path after the paper has been cut. In opening cutter blade 106, staggered gear 112 rotates counterclockwise, with each successive gear tooth 305A meshing and unmeshing with fixed gear 110. As staggered gear 112 continues to rotate counterclockwise another transition occurs where the starter teeth 306A disengage with the teeth of fixed gear 110 and simultaneously the starter teeth 306B begins engaging with the teeth of clutch gear 116. Because starter teeth 306B are shorter than gear teeth 305B, the gears tend to mesh easily without binding or locking.

Unlike the arrangements of the related art illustrated in FIGS. 2A and 2B, wherein the torque to open blade 216 is limited by the slip torque of slip clutch 208, all the available torque from drive gear 111 is applied to open cutting blade 106. The full torque is available in both the forward and reverse directions for the desired amount of rotation while disengaging the drive when the staggered gear 112 is rotated back to its initial position. As such, none of drive motor 102's energy is lost on overcoming the overrunning torque of a slip clutch or similar solutions. In the related art, the overrunning torque of slip clutch 208 acts as a drag on the motor or power source and increases the size of the motor to overcome the torque resulting in a waste of energy. Additionally, as the slip clutch 208 wears, the overrunning torque may decrease, which lessens the load on the motor, but tends to allow cutter blade 216 to fall to open. Finally, the overrunning torque of prior art may increase over time, which will increase the load on the motor, decreasing the motor's ability to feed paper through the printer. With the present invention, there is minimal overrunning torque and consequently, no additional load on the motor. As such, the motor can be more efficient and reliable.

Although the invention has been described with reference to specific embodiments, these descriptions are not meant to be construed in a limiting sense. Various modifications of the disclosed embodiments, as well as alternative embodiments of the invention will become apparent to persons skilled in the art upon reference to the description of the invention. It is therefore, contemplated that the claims will cover any such modifications or embodiments that fall within the true scope of the invention.

What is claimed is:

1. A method for cutting a role of paper positioned in a printer comprising the steps of:

engaging a first portion of a staggered gear causing the staggered gear to rotate until a second portion of the staggered gear is engaged whereby such rotation causes a cutter blade to move across a paper path; and reversing a rotation of the staggered gear until the first portion is engaged whereby such reverse rotation causes the cutter blade to reverse movement across said paper path, wherein the reversing step further comprises the steps of:

reversing a rotation of the drive gear engaged with the second portion of the staggered gear causing a reversal in the rotation of the staggered gear until a clutch gear engages the first portion of the staggered gear such that the clutch gear rotates the staggered gear and the drive gear is no longer in contact with the staggered gear;

engaging a cutter blade bracket with the staggered gear such that the cutter blade is moved back to a original position; and decoupling the clutch gear from a clutch when the staggered gear reaches the original position such that no power is transmitted to the clutch gear and the staggered gear remains stationary.

2. The method as recited in claim 1, wherein the staggered gear consists of the first portion having a first peripheral surface capable of meshing with a surface of a clutch gear and the second portion having a second peripheral surface capable of meshing with a surface of a drive gear and the second portion is secured to the first portion such that said first portion is contiguous with said second portion and said first portion is staggered along a rotational access with respect to said second portions such that each peripheral surface are independently driveable.

3. The method as recited in claim 1, wherein the first portion of the staggered gear does not reside in a same plane as the second portion.

4. A method for cutting a role of paper positioned in a printer comprising the steps of:

engaging a first portion of a staggered gear causing the staggered gear to rotate until a second portion of the staggered gear is engaged whereby such rotation causes a cutter blade to move across a paper path, wherein the engaging step further comprises the steps of:

coupling a clutch gear to a one-way clutch such that the clutch gear engages the first portion of the staggered gear causing the staggered gear to rotate;

rotating the staggered gear until the second portion of the staggered gear engages a drive gear and is driven by the drive gear such that the clutch gear is no longer in contact with the staggered gear; and engaging a cutter blade bracket with the staggered gear causing the cutter blade bracket to rotate such that the cutter blade crosses a path of the paper and the paper is cut; and reversing a rotation of the staggered gear until the first portion is engaged whereby such reverse rotation causes the cutter blade to reverse movement across said paper path.

5. The method as recited in claim 4, wherein the clutch gear and the drive gear are coaxial and adjacent to each other.

6. The method as recited in claim 4, wherein the engaging step further comprises the step of moving a pin attached near a periphery of the staggered gear such that the pin engages a slot of the cutter blade bracket.

* * * * *